June 18, 1946.   J. S. ENGEL   2,402,320
WEEDLESS ATTACHMENT FOR FISHHOOKS
Filed Oct. 23, 1943
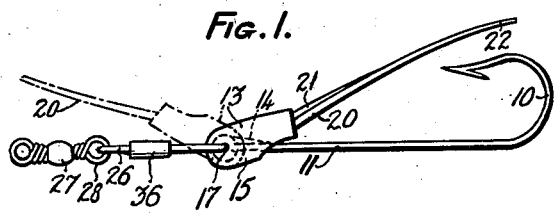
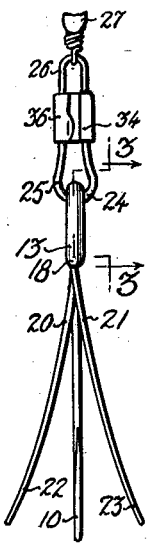
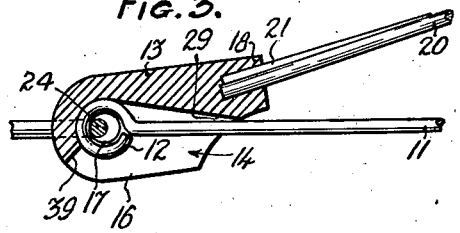
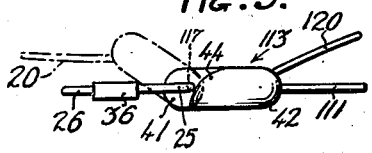
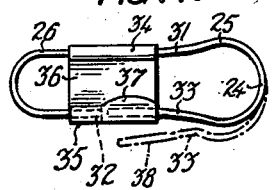
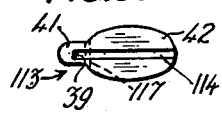
INVENTOR.
JAMES STEVEN ENGEL
BY
*Irving Seidman*
ATTORNEY.

Patented June 18, 1946

2,402,320

UNITED STATES PATENT OFFICE 2,402,320

WEEDLESS ATTACHMENT FOR FISHHOOKS

James Steven Engel, New Rochelle, N. Y.

Application October 23, 1943, Serial No. 507,393

2 Claims. (Cl. 43—39)

This invention relates to fish hooks generally and has particular reference to weedless fish hooks.

One of the objects of this invention is to provide improvements in fish hook assemblages which will be of such nature as to result in securing important advantages under varying conditions, such as found when fishing in water having weeds or other obstructions and when fishing where different types of fish are to be caught.

Another object of the invention is to provide a device having novel constructional features with attachments therewith for deflecting weeds or other obstructions, said device being removable and attachable to various size fish hooks.

A feature of the invention is an attachment which is adapted for use in connection with fish hooks, and having features which may be used with hooks of different sizes, said attachments being interchangeable with various sized hooks.

Yet other objects of the invention are to provide fish hook attachments of this kind which are of a simplified nature, economical of manufacture, and which may be attached to and removed from fish hooks expeditiously.

With the above indicated objects in view, as well as others which will hereinafter appear, the invention resides in the stated arrangements and combinations of parts, the essential features of which are herein fully described, and illustrated in the accompanying drawing, in which:

Fig. 1 is a side elevation of a fish hook assemblage constructed according to this invention;

Fig. 2 is a plan view of the assemblage of Fig. 1;

Fig. 3 is an enlarged detail view on part of the line 3—3 of Fig. 2;

Fig. 4 is a plan view of a coupling per se;

Fig. 5 is a fragmentary view similar to part of Fig. 1, but showing a modification of structure in the nature of a sinker with weed guard members; and Fig. 6 is a bottom plan view of the sinker or base member of Fig. 5.

In said drawing is shown a fish hook of usual construction, having a hooked end 10, including a point, and a shank 11 having an end eye 12.

The forward ends of the two weed guard members 20, 21, are fixedly set, in adjoining relation, in an offset back end 18 of the base member 13. The back ends 22, 23, of these guard members, as well as the intermediate portions thereof are constructed of metal, as in the form of a stamping or casting, or of synthetic material, as when molded or otherwise formed. A base member 13 has therein a recess 14, which is laterally bounded by like flanges 15, 16. The flanges 15, 16 have therein registering apertures 17, which are also adapted to register with the opening of the eye 12, the latter being disposed in the recess 14, in the operating position.

In an offset back end 18 of the base member 13 are fixedly set in adjoining relation the forward ends of two weed guard members 20, 21, the back ends 22, 23 of which, as well as the intermediate portions, being so positioned as to deflect weeds or other obstructions, thereby to keep the point of the fish hook, with the usual bait thereon, clear and in advantageous condition to form a bite for the fish.

Removably passing through the apertures 17 of the base 13 and the eye 12 of the fish hook 11 is a pivotal bearing member 24 (Fig. 3). The member 24 is a portion of a loop 25 of a coupling unit, which includes a draft eye 26 for receiving the usual line, or, as at present shown, a swivel 27. The swivel has an eye 28 at one end, cooperating with the eye 26, the other end of the swivel being adapted to receive the line. Said coupling is formed of a wire having a medial part 31, an end 32, and a spring arm 33. A sheet metal clip 36 has folds 34, 35, which embrace the part 31 and the end 32 of the coupling. The clip 36 is also formed with a wing or tab 37, turned slightly outwardly at its top part, thereby to form a receiver and seat for the end 38 of the spring arm 33. Said arm, as shown in dash-and-dot line, has an outward position, and is readily removable from its seat, to be passed through the apertures 17 and eye 12, thereby to hold the base member in the assembled position, by the pivot portion 24. Of course, other types of couplings may be used to remove the base member from the eye of the hook so that the base member with the weed deflectors and the different hooks may be interchangeable, or if desired, the fish line could be used to join the hook and deflector element directly.

In the drawing is shown in full lines backward or usual working positions of the deflector members 20, 21, and also, in dash-and-dot lines, forward positions, the latter positions, being used, for example, when baiting the hook or when removing a fish therefrom. In the backward position, a boundary face portion 29 of the recess 14 acts as a stop for the member 13 with its mounting when coming into contact with shank 11, and in the forward position a face 39, coming into contact with the shank 11, near the eye 12, also acts as a stop. The member 13 is easily pivoted from the backward to the forward position so that a fish nibbling upon the bait upon touching the deflectors will cause the deflector members to move toward the forward position. When the fish is pulled in, the current will cause the deflectors to move to the backward position, that is over the hooked end 10. In Figs. 5 and 6 is shown a modified form of the invention. The structure of Fig. 5 includes a sinker or base member 113, which is of metal, to serve as a weight or sinker.

A coupling unit 36 cooperates with the sinker member 113, deflecting arms, including a member 120, and a fish hook having a shank 111. A forward part 41 of the member 113 is freely movable in the loop 25 of the coupling unit, said member having a channel or recess 114 for the shank 111, and aperture 117 to cooperate with the eye 12 of said shank.

To render the weight of the sinker 113 sufficient, an expansion 42, in the present instance elliptical in form, is provided, said expansion having arcuate, upper, like faces 44, one of which is seen in Fig. 5.

Variations other than those specified may be resorted to, within the scope of the invention, and parts of the improvements may be used without others.

I claim:

1. The combination of a fish hook having a shank with a hooked end and an eye, a pivotally movable mounting including a base having a recess for the eye, and the base having in the walls of the recess registering apertures, said recess providing at its boundaries forward and rear stops, divergent guard arms having ends fast on said base, and a coupling including a draft eye and having a loop, said loop having a portion disposed in said apertures and in the hook eye, said loop portion forming a pivotal bearing, whereby said mounting may be swung to a forward position and into a backward position where said arms guard the hooked end.

2. The combination of a fish hook having a shank with a hook and an end having an eye, a pivotally movable attachment including a mounting base having a recess for the eye, the base having in the walls of the recess registering apertures, said recess providing at opposite boundary faces thereof forward and rear stops, divergent arms having ends fast on said base, a coupling comprising a wire including a draft eye and having a loop including a spring arm and a portion forming a pivotal bearing, and a keeper carried by said wire and having a portion forming a seat for the end of said spring arm, said loop being disposed in the hook eye and in said apertures, whereby said attachment may be swung between a forward position and a backward position with said arms guarding said hook.

JAMES STEVEN ENGEL.